US012442495B2

(12) United States Patent
Deng

(10) Patent No.: US 12,442,495 B2
(45) Date of Patent: Oct. 14, 2025

(54) HIGH-VOLTAGE LED STRING LIGHT AND METHOD OF MANUFACTURING THEREOF

(71) Applicant: DONGGUAN YONGFENG LIGHTING CO., LTD, Dongguan (CN)

(72) Inventor: Zhumei Deng, Dongguan (CN)

(73) Assignee: Dongguan Yongfeng Lighting Co., Ltd, Dongguan (CN)

( * ) Notice: Subject to any disclaimer, the term of this patent is extended or adjusted under 35 U.S.C. 154(b) by 0 days.

(21) Appl. No.: 18/418,885

(22) Filed: Jan. 22, 2024

(65) Prior Publication Data

US 2025/0230908 A1 Jul. 17, 2025

(30) Foreign Application Priority Data

Jan. 12, 2024 (CN) ........................ 202410046398.6

(51) Int. Cl.

*F21S 4/10* (2016.01)
*F21V 15/01* (2006.01)
*F21Y 115/10* (2016.01)

(52) U.S. Cl.

CPC ................ *F21S 4/10* (2016.01); *F21V 15/01* (2013.01); *F21Y 2115/10* (2016.08)

(58) Field of Classification Search

CPC ........................................................ F21S 4/10
See application file for complete search history.

(56) References Cited

U.S. PATENT DOCUMENTS 7,740,503 B1 * 6/2010 Tsai .................. H01R 13/6608 439/619
8,083,393 B2 * 12/2011 Yu .......................... F21V 17/06 362/267
10,393,351 B2 * 8/2019 Chen ..................... F21V 17/101
10,823,376 B1 * 11/2020 Wang ................. F21V 19/0025
11,499,700 B1 * 11/2022 Tsai .......................... F21S 4/10
12,085,244 B1 * 9/2024 Tsai .......................... F21S 4/10
2015/0211727 A1 * 7/2015 Loomis ..................... F21V 3/02 362/375
2018/0187840 A1 * 7/2018 Chen ......................... F21S 4/10
2023/0128538 A1 * 4/2023 Lu ............................ F21K 9/90 362/249.06

* cited by examiner

*Primary Examiner* — William N Harris
(74) *Attorney, Agent, or Firm* — Enable IP P.C.

(57) ABSTRACT

A light assembly of a string light is disclosed. The light assembly includes a first wire and a second wire, each of the first wire and the second wire comprising an end exposing copper strands; a first light-emitting diode (LED) chip soldered to the exposed copper strands of the first wire and the second wire; a colloid encapsulating the first LED chip soldered to the first wire and the second wire; a light head securing the colloid and a part of the first wire and the second wire; and a decorative shell secured onto the light head and enclosing the colloid encapsulating the first LED chip.

6 Claims, 5 Drawing Sheets

HIGH-VOLTAGE LED STRING LIGHT AND METHOD OF MANUFACTURING THEREOF

CROSS-REFERENCE

This application claims the priority of Chinese patent application no. 202410046398.6, filed on Jan. 12, 2024, the content of which is incorporated by reference herein in its entirety for all purposes.

FIELD

This relates generally to string lights, and more particularly, to high-voltage light-emitting diode (LED) string lights and a method of manufacturing such string lights.

BACKGROUND

Traditional manufacturing of string lights requires individually attaching bulbs to a wire, which cannot be done efficiently in mass with existing mechanized production methods. A simplified and flexible way of mass producing string lights is desired.

SUMMARY

In one aspect, this disclosure relates to a high-voltage integrated LED string light with multiple LEDs soldered directly to a wire. In another aspect, the disclosure relates to a method of making such high-voltage integrated LED string lights. According to the embodiments, LED chips are directly soldered to the copper wire of a string light in an automated fashion, eliminating the need for the manual processing of individual light bulbs in the traditional manufacturing process of string light, thereby simplifying the production process and reducing costs.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

Figure 1A:
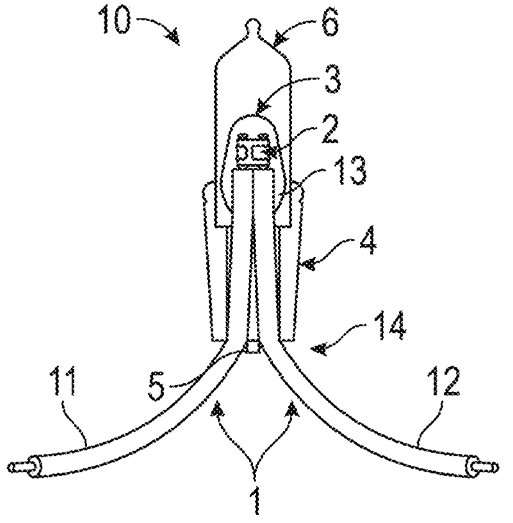
FIGS. 1A and 1B illustrate an exemplary light assembly of a string light, according to an embodiment of the disclosure.

In one aspect of the disclosure, the disclosure relates to a high-voltage string light. A string light can include one or more lights connected by a wire. In the disclosed embodiments, LED chips are used as the lights of the string light. FIG. 1A illustrates an exemplary light assembly 10 that is part of a string light, according to an embodiment of the disclosure. As illustrated, light assembly 10 can include an LED chip 2 connected to wire 1 of the string light. Wire 1 can be a UL22 wire or any other suitable type of wire according to the usage needs of the string light. LED chip 2 can be SMD LED chips (e.g., 2025, 2835, 3939 SMD LED chips) or any other type of LED chips based on the usage needs of the string light. In this example, wire 1 includes a first wire 11 and a second wire 12 joined at one end. LED chip 2 can be soldered to both wires 11, 12 of wire 1 at the joined end 13 (as discussed in detail below).

The light assembly 10 can also include LED colloid 3 that encapsulates and protects LED 2 to insulate it from the environment as much as possible. LED colloid 3 can be molded into various shapes according to needs. LED colloid 3 can be of a variety of transparent or translucent light-transmitting materials. LED colloid 3 can be formed over LED chip 2 using processes including but not limited to injection molding, casting, and foam injection.

The light assembly 10 can also include light head 4 that serves to secure the first wire and the second wire 12 and decorate and protect the interior LED chip 2. In various embodiments, light head 4 can be of different shapes, and can be assembled or made by any suitable methods such as foam injection.

The light assembly 10 can additionally include a rear plug 5 of the light head 4. The rear plug 5 can be placed in a space between the two wires 11, 12 of wire 1, as illustrated in FIG. 1A, to fixate the positions of the light head 4 and the LED chip 2 on wire 1. The rear plug 5 can also serve to reduce water ingress at the rear end 14 of the light head 4. The rear plug 5 can be optional in some embodiments.

The light assembly 10 can also include a decorative shell 6, which can have various shapes such as the shape of mini light bulbs, spheres, etc. The decorative shell 6 encloses the LED colloid 3 and serves as the top of light head 4. The decorative shell 6 can be transparent or semi-transparent and light-permeable, made of glass or various plastic materials.

Figure 1B:
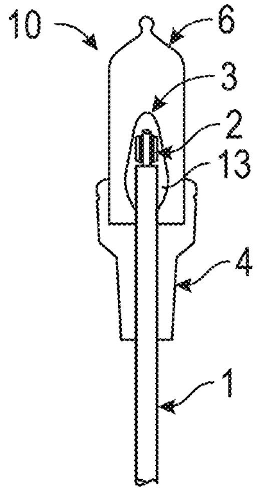

FIG. 1B illustrates a side view of the exemplary light assembly 10 of FIG. 1A. As illustrated, the LED chip 2 is soldered to the exposed end 13 of wire 1. In this example, the exposed end 13 is sandwiched between 2 pieces of the LED chip 2.

Figure 2A:
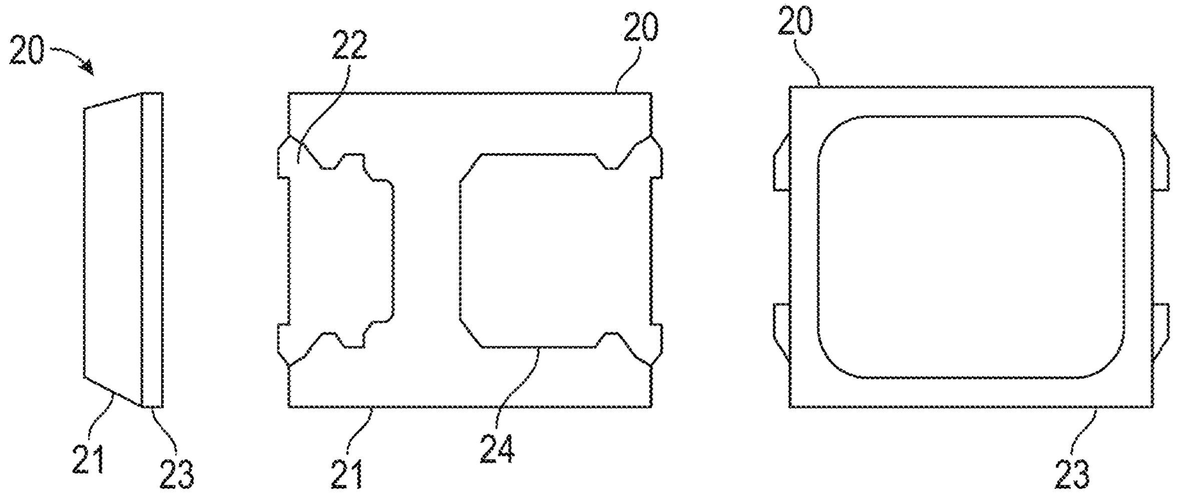
FIGS. 2A and 2B illustrate exemplary LED chips that can be used for making light assemblies of FIGS. 1A and 1B, according to an embodiment of the disclosure.
Figure 2B:
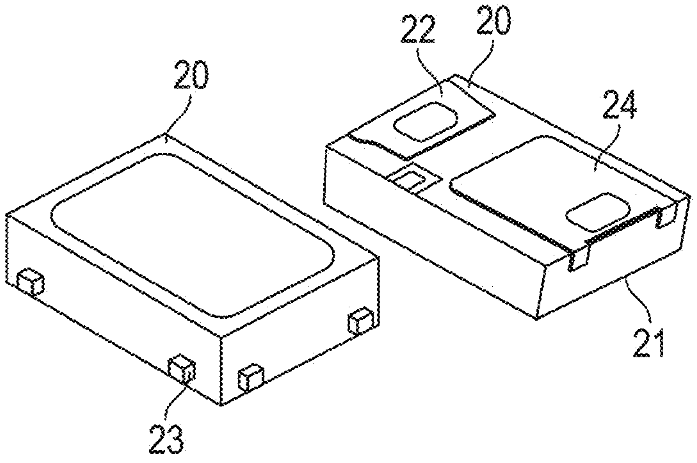

FIGS. 2A and 2B illustrate an exemplary LED chip that can be used for making a string light, according to embodiments of the disclosure. FIG. 2A illustrates two halves 21, 23 of a 2835SMD LED chip 20. The LED chip 20 can have two poles, anode 22 and cathode 24. Specifically, the anode 22 and cathode 24 can be soldered to exposed sections of the wire of a string light, as detailed in the paragraphs below.

A second aspect of the disclosure relates to a method of making high-voltage string lights having light assemblies such as the one illustrated in FIG. 1A. FIGS. 3A-3E illustrate the exemplary steps in manufacturing a string light, according to one embodiment of the disclosure.

Figure 3A:
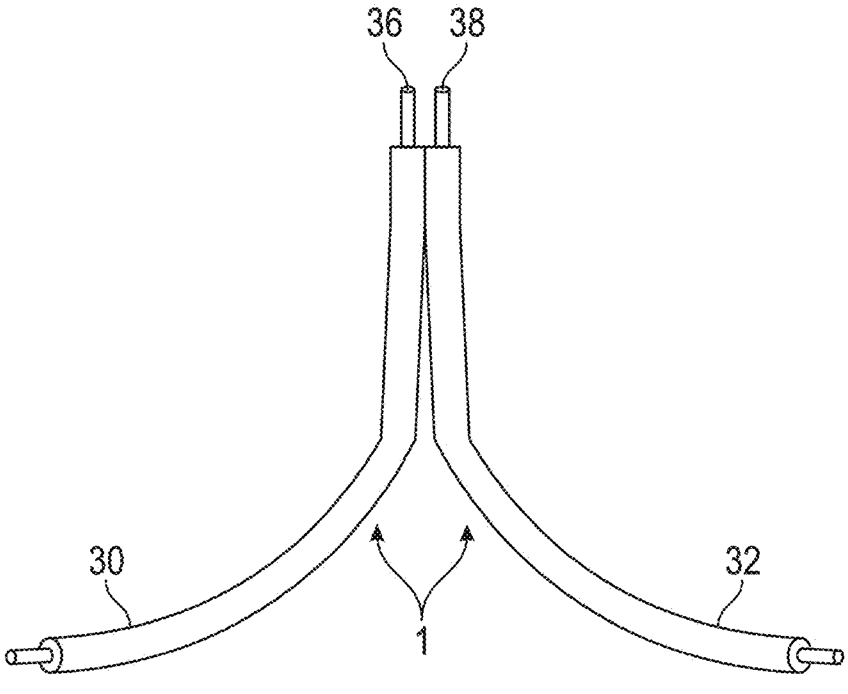
FIGS. 3A-3E illustrate the exemplary steps in manufacturing a string light with LED chips soldered directly to a wire, according to an embodiment of the disclosure.

First, as shown in FIG. 3A, a pair of wires 30, 32 are provided. One end of each wire 30, 32 can be stripped of insulation to expose a portion of the copper wire (or copper strands) 36, 38. In one embodiment, the exposed copper strands 36, 38 can be tin-plated and secured, making it easy to perform the subsequent soldering step.

Figure 3B:
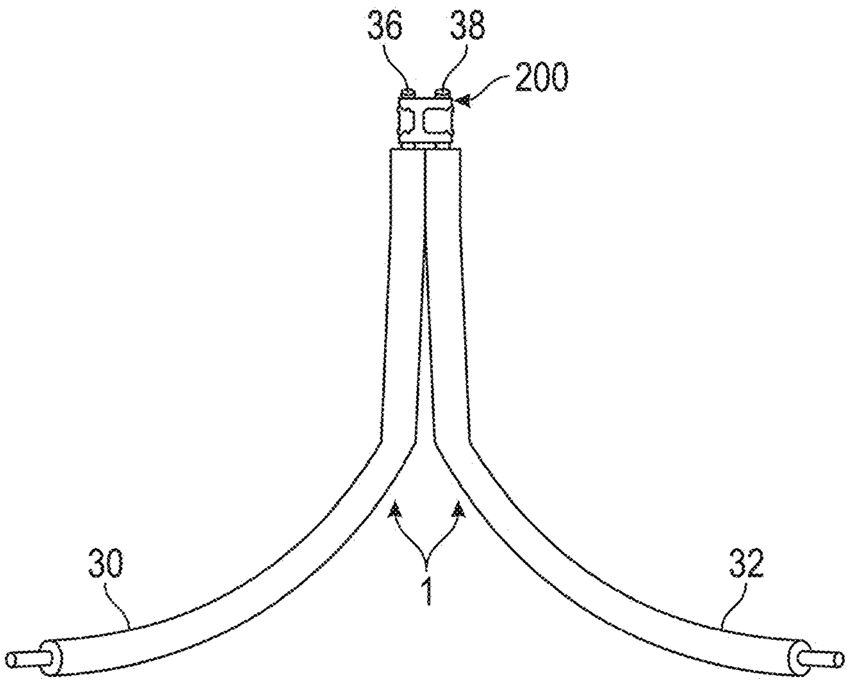

In the next step, illustrated in FIG. 3B, an LED chip 200 can be soldered onto the exposed ends 36, 38 of the two wires 30, 32. Depending on the requirements, one or multiple LED chips can be soldered onto the wires 30, 32. The LED chip(s) can be soldered on the front, back, or top of the two copper wires 36, 38.

Figure 3C:
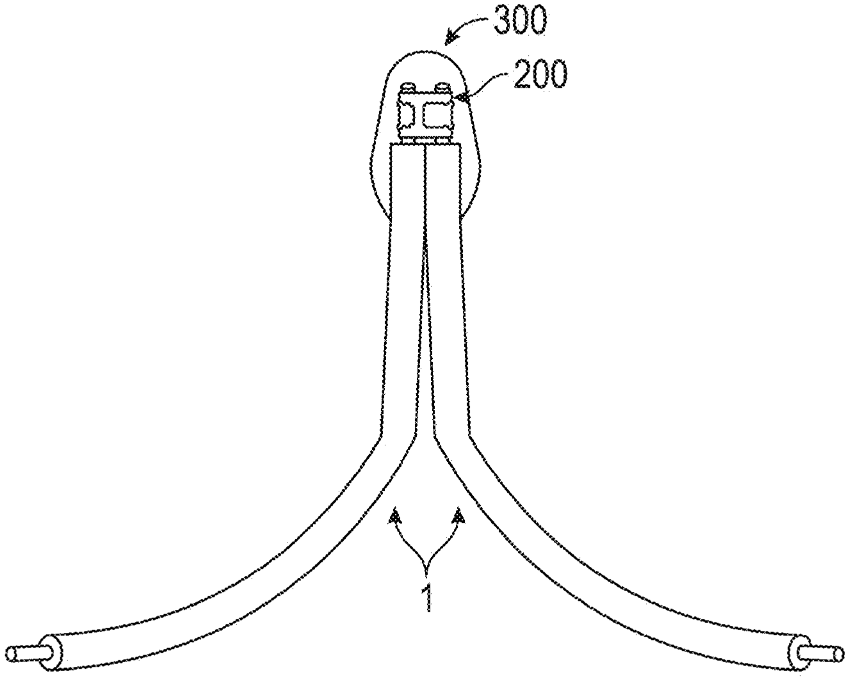

FIG. 3C illustrates the next step in the process. In this step, the soldered LED chip 200 is encapsulated by a colloid 300. The colloid 300 can be shaped into any form as needed. Various transparent or semi-transparent light-permeable colloids can be used. Encapsulating the LED chip 200 with the colloid 300 can be achieved through processes such as injection molding, casting, or foam injection.

Figure 3D:
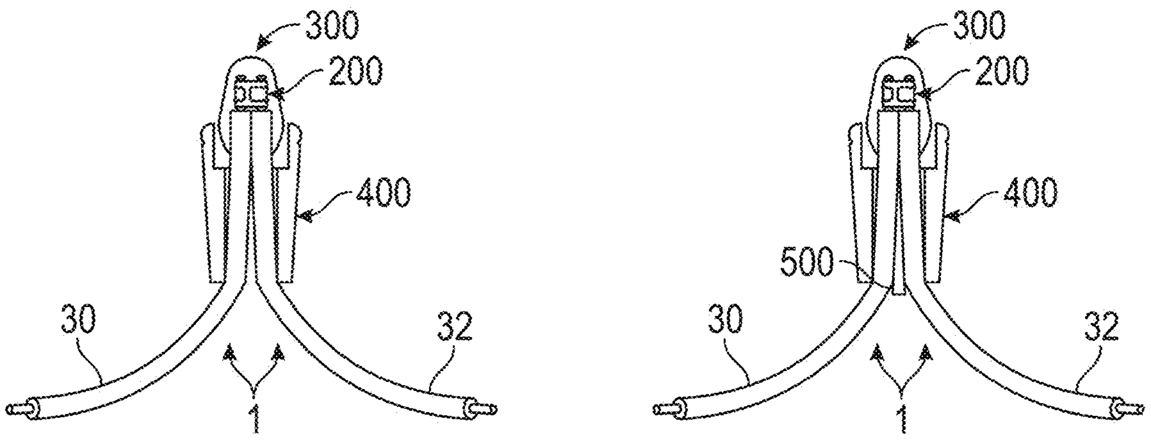

Next, as illustrated in FIG. 3D, a light head 400 can be made (e.g., assembled or by foam injection) and affixed to the wires 30, 32 to decorate and protect the colloid encapsulated LED chip 200. Optionally, a rear plug 500 can be placed in a space between the two wires 30, 32 where the wires diverge, as illustrated in the figure.

Figure 3E:
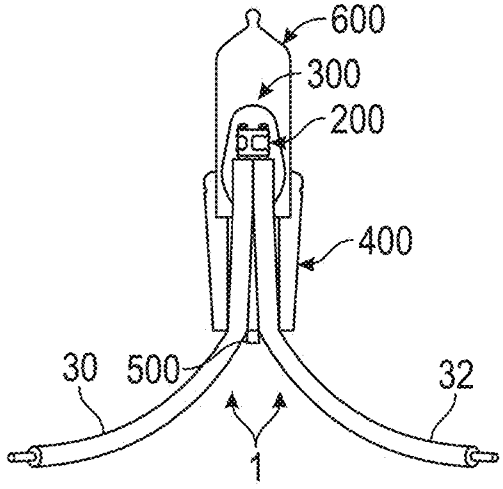

Finally, as illustrated in FIG. 3E, a decorative shell 600 can be installed on the light head to achieve an appearance similar to traditional light bulbs on string lights. Various decorative shells 600 can be made available. The decorative shell 600 can be in the shapes mini light bulbs, round globes, snowflakes, pentagrams, and any other desired shape. The decorative shell 600 can be made of transparent or semi-transparent light-permeable glass or various plastic materials.

Figure 4A:
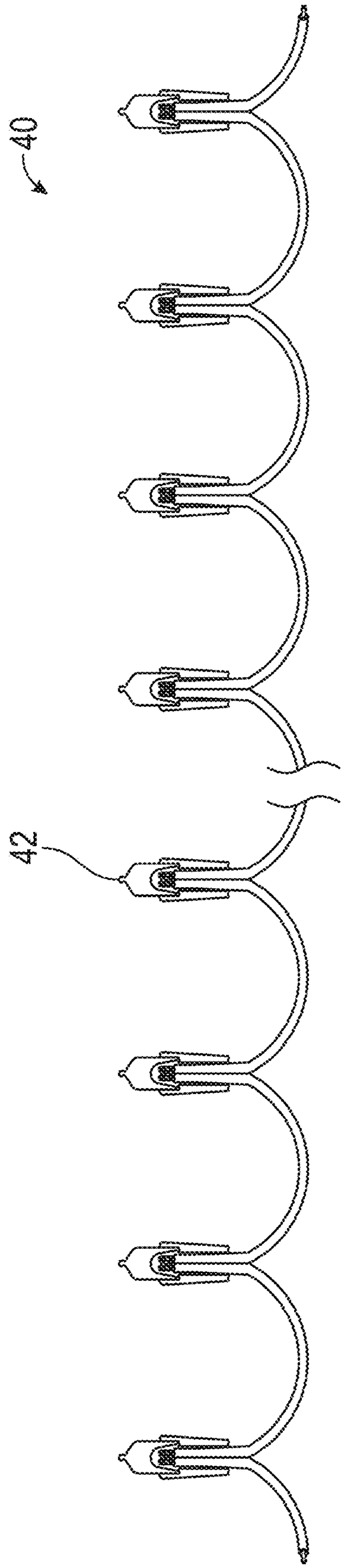
FIGS. 4A and 4B illustrate exemplary LED string lights manufactured using the methods disclosed in the embodiments of the disclosure.

FIG. 4A illustrates an exemplary wiring connecting multiple light assemblies (collectively 42) manufactured using the method disclosed above with reference to FIGS. 3A-3E. In one embodiment, each of the steps illustrated in FIGS. 3A-3E can be performed using machinery, thereby enabling mass producing the string light 40.

Figure 4B:
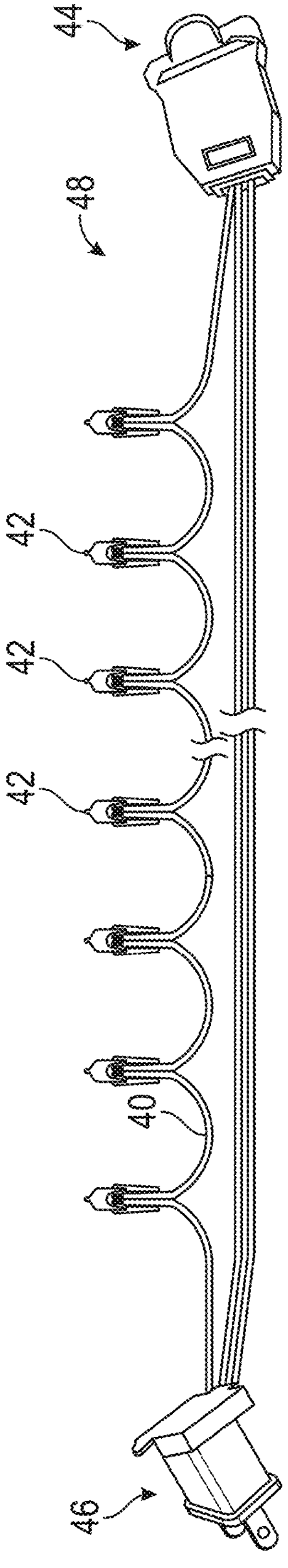

FIG. 4B illustrates a string light 48 including multiple wires connected to a cord connector 44 at one end and a plug end 46 at the opposite end. One of the wires connects multiple lights 42 made of LED chips using the method disclosed above.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of making a light assembly of a string light, the method comprising:

providing a first wire and a second wire;

stripping an end of each of the first wire and the second wire of insulation to expose a portion of copper strands of each of the first wire and the second wire;

encapsulating the first LED chip with a colloid;

attaching a light head to the first wire and the second wire after the first LED chip is encapsulated with the colloid; and securing a decorative shell on the light head after the light head is attached to the first wire and second wire, wherein the decorative shell and the light head enclose the colloid encapsulating the first LED chip.

2. The method of claim 1, further comprises placing a rear plug in a space between the first wire and the second wire where the first wire and the second wire diverge.

3. The method of claim 1, wherein soldering the first LED chip to the first wire and the second wire comprises soldering an anode of the first LED chip to the exposed copper strands of the first wire and soldering a cathode of the first LED chip to the exposed copper strands of the second wire.

4. The method of claim 1, wherein the light head is assembled or made by foam injection.

5. The method of claim 1, wherein the colloid is formed over the first LED chip using injection molding, casting, or foam injection.

6. The method of claim 1, further comprises soldering a second LED chip to the exposed copper strands of the first wire and the second wire.

* * * * *